United States Patent
Sharan

(10) Patent No.: US 10,181,128 B2
(45) Date of Patent: Jan. 15, 2019

(54) INITIATING A PROMOTIONAL BENEFIT BY USER-ACTIONABLE LINK

(71) Applicant: eBay Inc., San Jose, CA (US)

(72) Inventor: Yotam Sharan, Ramat-Gan (IL)

(73) Assignee: eBay Inc., San Jose, CA (US)

( * ) Notice: Subject to any disclaimer, the term of this patent is extended or adjusted under 35 U.S.C. 154(b) by 881 days.

(21) Appl. No.: 14/056,726

(22) Filed: Oct. 17, 2013

(65) Prior Publication Data

US 2015/0112785 A1 Apr. 23, 2015

(51) Int. Cl.
*G06Q 30/02* (2012.01)

(52) U.S. Cl.
CPC ..... *G06Q 30/0224* (2013.01); *G06Q 30/0222* (2013.01); *G06Q 30/0239* (2013.01); *G06Q 30/0253* (2013.01)

(58) Field of Classification Search
None
See application file for complete search history.

(56) References Cited

U.S. PATENT DOCUMENTS

| | | | | |
|---|---|---|---|---|
| 8,099,109 | B2* | 1/2012 | Altman | G06Q 30/0207 455/414.3 |
| 8,573,491 | B2* | 11/2013 | Bennett | G06Q 30/0207 235/383 |
| 2011/0270681 | A1* | 11/2011 | Outten | G06Q 30/00 705/14.58 |
| 2014/0100997 | A1* | 4/2014 | Mayerle | G06Q 30/0643 705/27.2 |
| 2014/0187201 | A1* | 7/2014 | Saatchi | H04M 1/72525 455/411 |
| 2015/0081804 | A1* | 3/2015 | Banatwala | H04L 51/043 709/206 |

OTHER PUBLICATIONS

A business model for personalized promotion systems on using WLAN localization and NFC techniques, Lam/Ng/Wang, 2013, 2013 27th International Conference on Advanced Information Networking and Applications Workshops, Pertinednt pp. 1-3.*

* cited by examiner

*Primary Examiner* — Fonya M Long
*Assistant Examiner* — Alexandru Cirnu
(74) *Attorney, Agent, or Firm* — Schwegman Lundberg & Woessner, P.A.

(57) ABSTRACT

An advertisement, including a description of a promotion and a link, are included in a shipment of a sales item to a buyer from an online shopping site. The promotion is crafted to entice the buyer to respond to the link and trigger a further shopping opportunity based on the initial purchase. Upon responding to the link, the buyer is presented with a further promotion that includes the most recent consideration of buying incentives which are based on knowledge of selling considerations such as inventory and the marketplace that a seller may use to generate enticing content in the promotion. The seller may also take advantage of knowledge about the shopping and purchasing history of the buyer at the online shopping site in tailoring the promotion.

20 Claims, 10 Drawing Sheets

US 10,181,128 B2

INITIATING A PROMOTIONAL BENEFIT BY USER-ACTIONABLE LINK

TECHNICAL FIELD

This patent document pertains generally to data processing, and more particularly, but not by way of limitation, to initiating a promotional benefit by user-actionable link.

BACKGROUND

Online marketplaces offer convenience to shoppers by gaining convenient access to shopping sites and an enormous selection of sale items to a shopper with a web browser. News sources have reported that a single global online shopping entity has recently surpassed the threshold of over 1 billion transactions daily. Business practices that contribute to sustaining and, ideally, expanding this trend are highly sought after in the online marketplace.

The large numbers of shoppers who have become buyers represents an opportunity for the online commerce site. A successful purchase by a shopper indicates that the shopper was able to navigate the online commerce site, find a sale item they wanted, complete a purchase, and become a successful buyer. This successful buyer experience represents shopping momentum on the part of the shopper and development of a satisfying experience in obtaining a desired item. The satisfaction of receiving a shipment of the purchased item brings fulfillment and, very likely, a sense of trust on the part of the buyer towards the ecommerce site. Opening the shipping package received by the buyer may bring both excitement and a bit of joy in having successfully received the item that was the subject of their shopping expedition. This moment may represent the pinnacle of the shopping experience for a particular buyer within the context of a particular online ecommerce site.

The online commerce site is highly desirous for capitalizing on this momentum by leveraging the sense of trust and the height of the shopper's emotional experience at the culmination of their buying experience. The time the package containing a newly purchased item is opened, represents the ideal time for the online commerce site in inducing a further purchase by the shopper. This is the time when the buyer may be at the height of motivation for further shopping based their previous successful buying experience.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. However, it will be evident to one skilled in the art that the present embodiments may be practiced without these specific details.

An ecommerce site user who has recently purchased an item at an online site has successfully completed a shopping and buying experience. They may have a found a great deal, located the perfect gift, or simply found a long-sought item for their personal enjoyment. The user may have invested a significant amount of time in navigating the online site and, perhaps, had performed further shopping and comparisons at competitors' sites. The time and energy expended by the user, as well as emotional factors gained in the experience, is focused at the online site where the final purchase is completed. Receipt of the package, that includes the final purchase from the online site, may be a heightened emotional time for the buyer and a situation that the seller and the ecommerce site may want to capitalize on.

Figure 1:
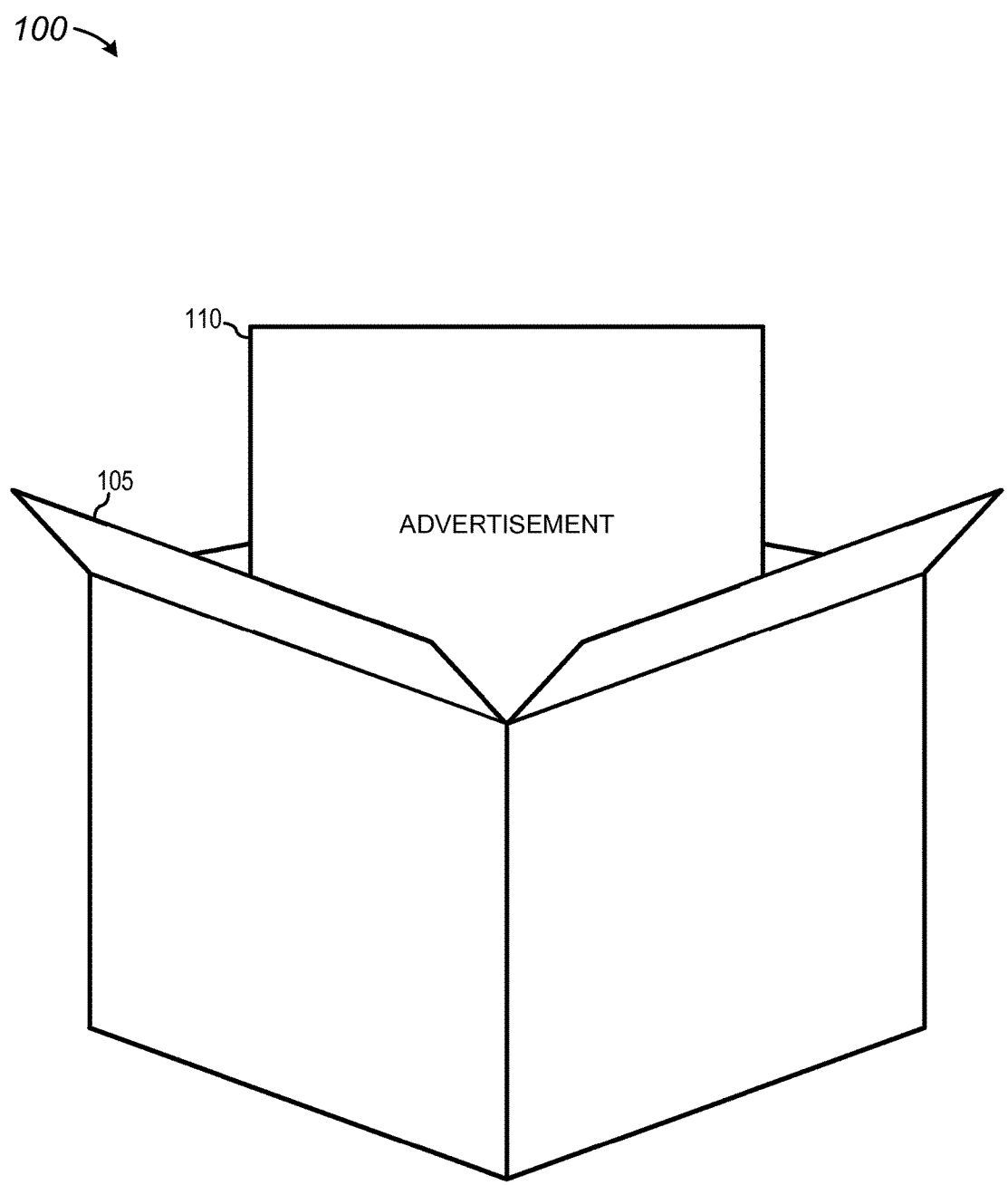
FIG. 1 is a diagrammatic representation of a shipment including an advertisement, according to example embodiments.

FIG. 1 is a diagrammatic representation of a shipment 100 in the form of a package 105 or a shipping box that includes an advertisement 110, according to some example embodiments. The package 105 may be shipped to a location that the buyer has specified during a shopping session or in a profile registered with the online site. The advertisement 110 may be included within the package 105, and be prominently placed within the package 105 such that the person unwrapping a purchased item will readily encounter the advertisement 110.

An amount of time from days to perhaps weeks may have elapsed from the time that the online shopper has completed their purchase at the ecommerce site to the time the user receives the package. At the time the shopper opens the package 105 and unwraps the purchased item, an associated sense of satisfaction and related emotions may be rekindled as the shopper takes possession of the purchased item. The occasion of receiving the purchased item may represent a sense of accomplishment in having obtained the item. This particular heightened experience may induce the shopper to want to experience similar satisfaction in a further shopping experience. The online site and their sellers may be highly motivated to take constructive advantage of the situation and at this particular moment in time.

The descriptions below may center around the shipment of a physical package to a buyer and the subsequent unwrapping of the package. It may also be noted that an alternative embodiment may be the receipt of an electronic package in the form of an e-card or gift card that may operate similarly to the package and advertisement described below. The package the buyer receives may be an electronic packaging of a product (e-card or electronic singing telegram), which may contain a flyer or advertisement and a user-actionable link, which may also be in electronic form and realized that a web browser or mobile application.

The term "user" may have equivalent meaning, throughout the remainder of the description, as the shopper, purchaser, or the buyer. The terms refer equally to a person operating a user device in communication with an online shopping site. The particular term selected to refer to the user or its equivalents may reflect a phase of an engagement with the online shopping site, such as shopping or buying.

The ecommerce site may desire to take advantage of the unwrapping phase of the shopping experience (e.g., when the user has just opened the package 105, unwrapped their purchased item, and has triggered memories of the successful completion of the shopping experience). At this particular time, the shopper not only has a sense of satisfaction, but also has shopping (and purchasing) momentum, as well as trust in the online site. The unwrapping phase may be the point in time where the user is significantly receptive to a further shopping and buying experience.

The buyer's heightened receptivity may be more crucial to the online site since the unwrapping phase has a direct correlation to the positive events that were experienced by the buyer at their particular online site. This may help distinguish the present online shopping site from other online sites the purchaser may have visited during their shopping experience. By capitalizing on the unwrapping phase and the subsequent positive events experienced by the user at the online site (e.g., the trust in the online site and the shopping momentum), the ecommerce site may promote further sales. The buyer's opening of the package 105 may also be the opportune moment to trigger a promotion of further sales by the seller of the purchased item.

Figure 2:
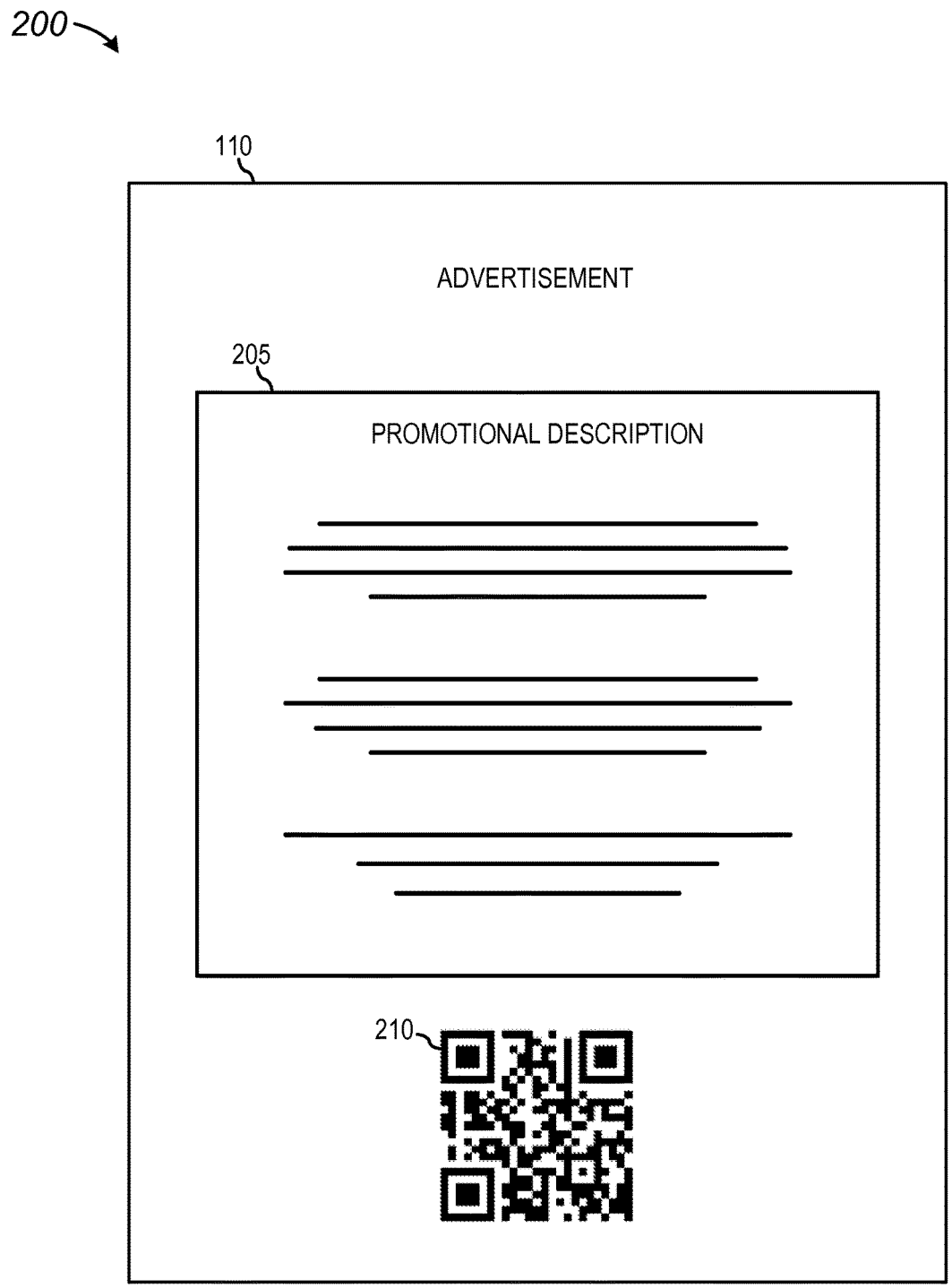
FIG. 2 is a diagrammatic representation of a promotion including a promotional description and link, as may be used in example embodiments.

FIG. 2 is a diagrammatic representation of a promotion 200, including a promotional description 205 and a user-actionable link 210 or "link," as may be used in some example embodiments. The promotional description 205 may be featured on the advertisement 110 that the buyer finds when unwrapping the package 105. The user-actionable link 210 may be implemented in various forms (described below).

The online ecommerce site may present a promotion 200 to the user at the unwrapping phase in order to increase the possibility of inducing further shopping by the buyer and to take advantage of the many influences on the buyer that the unwrapping phase provides. The term "promotion" may apply to a general program initiated by a seller or a seller in combination with an ecommerce site to induce buyers to purchase products. In the absence of a particular context, use of the term "promotion" may refer alternatively to the general sale-inducing program itself, a description of the promotion, an advertisement, or the offering of a promotional item (e.g., an offering or offered item of the promotion), for example. In the following description, unless a particular context determines otherwise, "promotion" may generally refer to a sales inducing program or the presentation of an advertisement featuring and describing the promotion. During the course of the following description, further distinctions between promotion, advertisement, promotional item, and promotional description will be presented.

When a promotion 200 accompanies the purchased item in the package 105 and is presented when the purchased item is unwrapped, the promotion 200 may have the best chance of inducing a further shopping experience by the buyer at the online site. Factors available to a seller to tailor a promotion 200 at the unwrapping phase are a heightened shopping awareness by the buyer and available knowledge about the buyer's shopping and purchasing history. Both of these factors may be combined with shopping offerings that have developed since the purchase was completed (discussed below).

The presentation of the promotion 200 may accompany the purchased item in the package 105 in the form of a flyer or advertisement 110. The promotion 200 may be presented in many alternative embodiments, such as a circular, a leaflet, a pamphlet, a handbill, a poster, an electronic advertisement, a projection on a screen, a postcard, or a paper advertisement. At the time of the package's delivery to the user's location, the promotion 200 may be presented by the shipping provider. The shipping provider may have entered into a selling campaign with the online ecommerce site or a particular seller whose connection may have come about through the ecommerce site. The shipping provider may present the printed flyer with the delivery of the package 105 that includes the original purchase item.

The "hand delivery" of the promotion 200 (e.g. a printed flyer) by the shipping provider may be part of the selling campaign. In order to qualify for the promotional benefit, the buyer may have to forward the promotion 200 (e.g., same flyer or a further printed flyer) to a friend. This physical distribution may be undertaken to provide face-to-face connection between buyer and a friend, or for delivery to a person that does not have a computer or Internet connection. Alternatively, the promotion 200 may be delivered in the mail or by a postal service where the delivery time of the package 105 is anticipated and the delivery of the mailed item is targeted to coincide with the delivery of the package 105.

The promotional description 205 may describe an item ("promotional item") or benefit (also "promotional benefit") that is obtainable by the buyer when certain purchasing behaviors or buying requirements are met while shopping. The promotional item may be a physical item, such as a pen, a flashlight, a cap, or a mug, for example. The promotional item may be branded with a logo of the seller, markings that commemorate a particular occasion, or a special relationship of the successful buyer with the purchased item. The promotional item may be associated with and marked according to a special occasion, such as a holiday, a birthday, a special event, or notations commemorating a time or season of the year. For example, a mug may be offered that includes an engraving commemorating an annual world championship of a sporting event and a team logo for which the user has purchased commemorative memorabilia. The mug may be offered as a promotional item to acknowledge a certain amount of memorabilia being purchased by the user.

The promotional item may be selected from available additional sales items due to a correspondence between the original purchased item and a characteristic of the selected promotional item. A seller may maintain tags or listings of terms that denote a characteristic or feature pertaining to all items purchased from the buyer at the online site. Promotional items that the seller may consider in selecting for inclusion into various types of promotions may have similar characteristics as the original purchased item. At the time the promotion 200 is presented to a shopper, a promotional item or multiple items may be presented to the shopper based on a correlation between the characteristics of their recently purchased item and an additional sales item the seller wishes to sell. For example, if the buyer has just purchased a camera, additional items that might make great accessories for the buyer (due to their correlation with a camera) may include a tripod, a carrying case, and a strobe light. The seller may initiate a process of matching the characteristics of the prior sale of the camera with the characteristics of the accessories items, and select one or more of the accessories to be featured in the promotional description 205 presented to the buyer.

In other example embodiments, the additional sales items offered might have characteristics that relate to general aspects of the initial purchased item. These aspects between sales items may be a correlation between the subject or area of interest behind the original purchased item and the additional sales items. For example, if the originally purchased item is a football, the additional sales opportunities may be centered around football or sports generally. For example, the prior sale of the football may trigger a seller to select for a promotional description 205 from athletic gear, autographs by notable players, or commemorative memorabilia of professional teams associated with the game of football.

The promotion 200 may be an offering of an amount of money discounted off a next purchase, a percentage of discount on purchases that reach a purchasing threshold, a purchasing card (prepaid and charge-card-like), a gift card, or certificate for a certain purchasing behavior, for example. The promotion 200 may be an opportunity to purchase additional items or obtain a discount once a certain number of items have been purchased. Certain promotion types may include a buying one sale item and getting another one for free (buy-one-get-one [BOGO] or a two-for-one offer), a simple count of sales items of the same type, or a total number of purchases selected from a qualified selection of sales items, for example. A promotion 200 may be presented when the buyer forwards the flyer or a promotional description 205 to a friend or acquaintance at a social network.

A promotion 200 presented on a flyer or similar hardcopy medium may include a link as part of the opportunity for gaining access to a promotion site to exercise and acquire the promotional benefit. The link may be referred to as an actionable link or a user-actionable link 210. The user-actionable link 210 may mean that some action on the part of a user must be taken in order for the link to be activated. The user-actionable link 210 may be a scannable link where a user may utilize the image scanning capabilities of a Smartphone, for example, to implement the user-initiated action of scanning. The user-actionable link 210 may also be referred to as a user-selectable link meaning that the user may need only click "select the link" with the use of a computer mouse or touchpad in order to position a cursor and make a click-selection of the user-actionable link 210 on a personal computer or mobile device. Any of the physical paper or card stock embodiments of the flyer (or similar embodiments mentioned above) may be printed with a code that is actionable or scannable by a user device.

The flyer may include markings such as text or symbolic graphics that indicate how the user-actionable link 210 is actionable by the user. For example, the text may explain how the user may scan the user-actionable link 210 with a Smartphone having a camera or scanner and access to a mobile web browser. Symbolic graphics may indicate to a user, with icons or pictographs, how the user may use a handheld device to scan the user-actionable link 210 formed as a printed code.

Such a printed code may implement the user-actionable link 210 when a user takes a particular action, such as scanning the user-actionable link 210, according to certain example embodiments. The code may be a barcode, a two dimensional barcode, a code written in text, portions of the shipping label, a tracking code (from shipping label), or a quick response (QR) code. Such codes may also be referred to as a user-actionable link 210, a user-actionable code, or a user-scannable link.

The flyer may also include an embedded device to communicate wirelessly with a mobile device (e.g., the Smartphone or desk-side computer) with wireless communication capability, such as or similar to near field communication (NFC), for example. The flyer with such an embedded device may be brought into proximity of the user's mobile device and be communicatively coupled by an electromagnetic communications link. In this way, the flyer may operate in a fashion similar to that of a radio frequency ID (RFID) device or card or a wireless local area network (Wi-Fi) connection. The establishing of the communication link between the flyer and the user device may establish the scanned link similar to those discussed above with regard to scanning the printed code. Alternatively, either a portion or all of the embedded communication device may be provided in the shipment as part of the package 105, where the advertisement 110 provides either text or graphics to explain the use of the package 105 being in proximity to the user device to effect the triggering of the user-actionable link 210.

Figure 3:
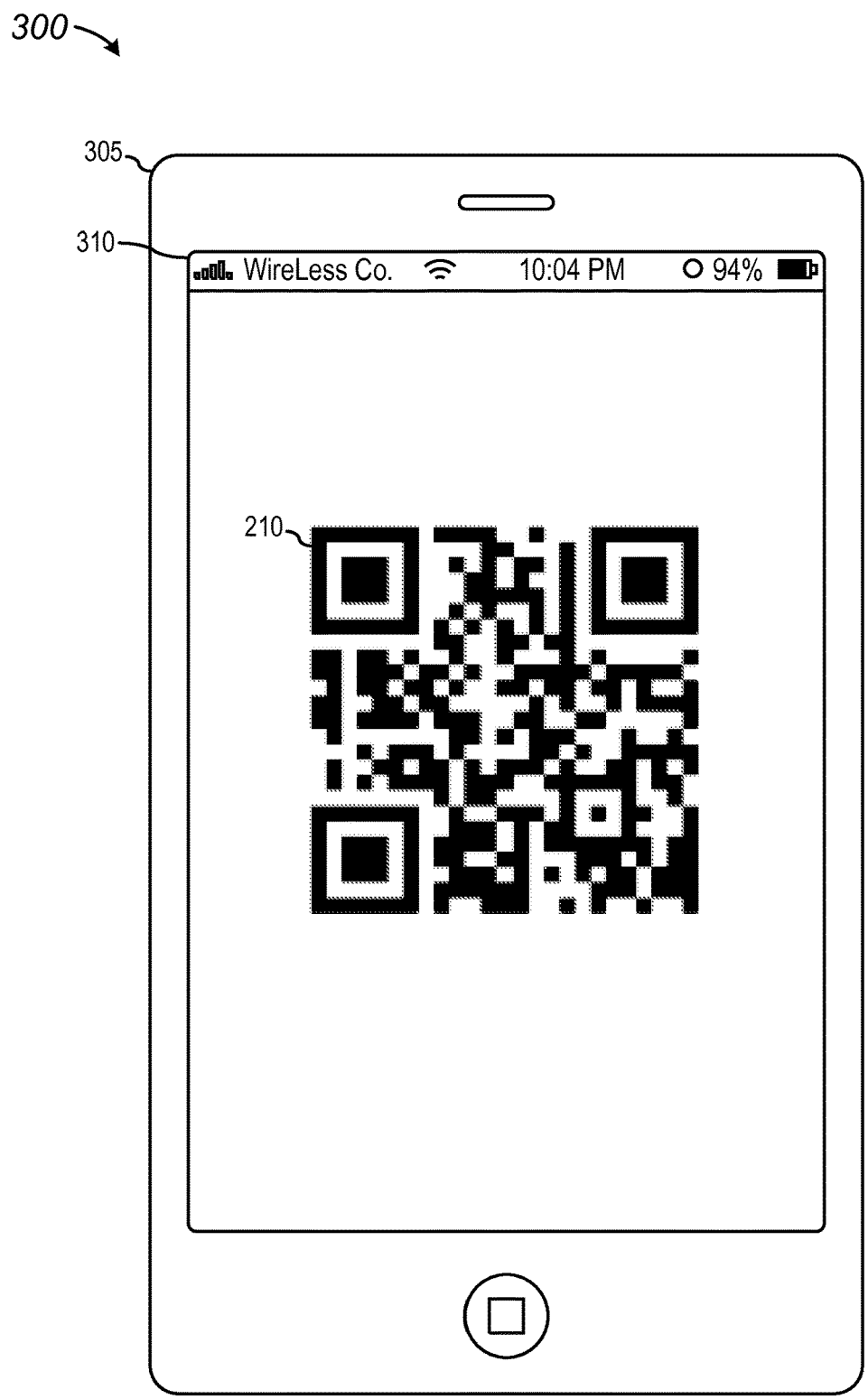
FIG. 3 is a diagrammatic representation of a scanned code presentation on a user device, according to example embodiments.

FIG. 3 is a diagrammatic representation of a scanned code presentation 300 on a user device, according to example embodiments. A user device 305 may be a mobile device such as a Smartphone and include a user device display 310. A camera or scanning device (not shown) may be included in the user device 305 and be used to scan the user-actionable link 210 on the advertisement 110. Scanning of the user-actionable link 210 may cause the user-actionable link 210 to be available on the user device 305 for viewing by a user to confirm that the scanning has been successful, for example. The successful scanning of the user-actionable link 210 may also trigger a promotion 200 from an online site.

When the user-scannable link 210 is scanned by a user device 305 (e.g., mobile device) such as a Smartphone, an included camera or embedded scanner device capable of optically capturing (scanning) the user-scannable link 210, may be utilized to provide the image to a processor for transforming into an actionable code. Any scanning device capable of capturing an image of the printed code, as described in any of the embodiments above, may be utilized to capture the user-scannable link 210. A standalone scanning device, which may be battery-operated and wirelessly connected to a computing device, or directly connected to a further processing machine may be utilized. Any scanner or camera capable of obtaining barcodes or printed codes as described above may be utilized, whether that scanner is an integral part of a mobile device or is connected, such as by a wired connection, to a processing machine.

The transformation of the code may include an internal process to electronically scan the image to produce a corresponding equivalent operable code. The operable code may present an internal representation enabling a scanning system to take action, such as connecting with a particular landing page at a website where a promotional site may be displayed.

Figure 4:
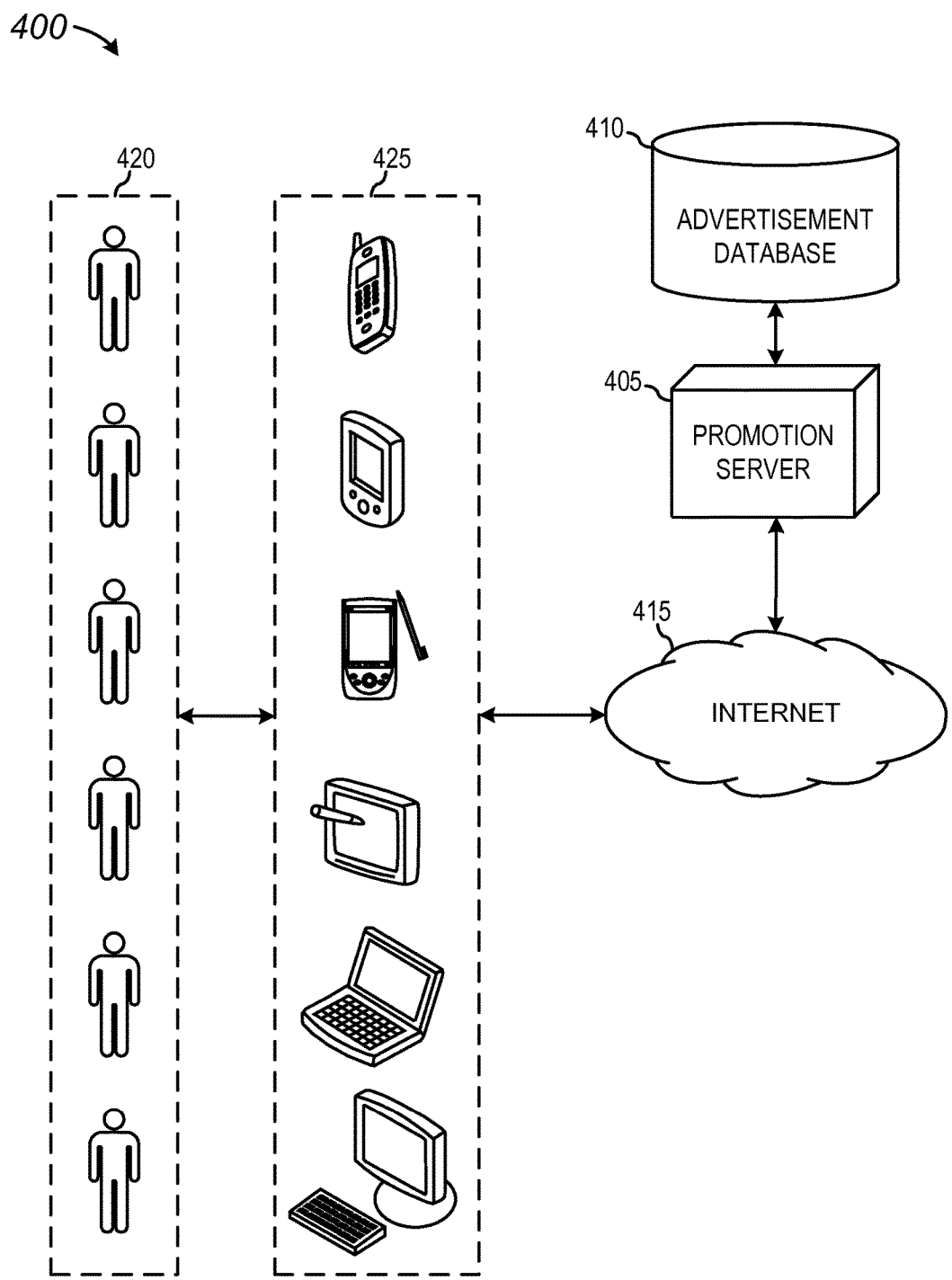
FIG. 4 is a diagrammatic representation of a promotion generation environment, according to example embodiments.

FIG. 4 depicts a promotion generation environment 400, including a promotion server 405 and an advertisement database 410. The promotion generation environment 400 is an example embodiment of an online network for promotion generation between multiple users 420 utilizing various network access devices 425 that may be facilitated by the Internet 415. The promotion server 405 maintains communication with the network access devices 425 of the multiple users 420 participating in online ecommerce sessions. The multiple users 420 may include both buyers and sellers involved in online ecommerce. The promotion server 405 may facilitate the generation of promotions by sellers and receipt of various selections of those promotions by buyers. The promotion server 405 may receive promotional descriptions generated and configured by sellers, and store the promotional descriptions in the advertisement database 410. The promotion server 405 may also receive input from the sellers to configure and transmit promotions from information (such as promotional snippets) stored in the advertisement database 410, and transmit selected promotional descriptions to the buyers through the Internet 415. The promotion server 405 may maintain all details of promotions, promotional descriptions, and portions of promotional descriptions that may be used for configuring complete promotions. The promotion server 405 may also monitor the participation by buyers in various promotions by directly retaining shopping and purchase behaviors of the buyers in the advertisement database 410.

A promotion server 405 and the advertisement database 410 may be communicatively coupled through the Internet 415 to multiple users 420. The multiple users 420 may be communicatively coupled through a particular device, selected from various network access devices 425, to the Internet 415, the promotion server 405 and the advertisement database 410. The various network access devices 425 may include a cell phone, a Smartphone, a personal data assistant, an electronic tablet, a notebook computer, a desktop computer, a desk-side computer, and a terminal, for example. Any one of the various network access devices 425 may be used by the respective user for online shopping and purchasing, and by the seller for the generation of promotional descriptions and configuration and transmission of promotions. A particular user may have multiple network access devices 425 for any combination of shopping, purchasing, and promotional generation activity.

Figure 5:
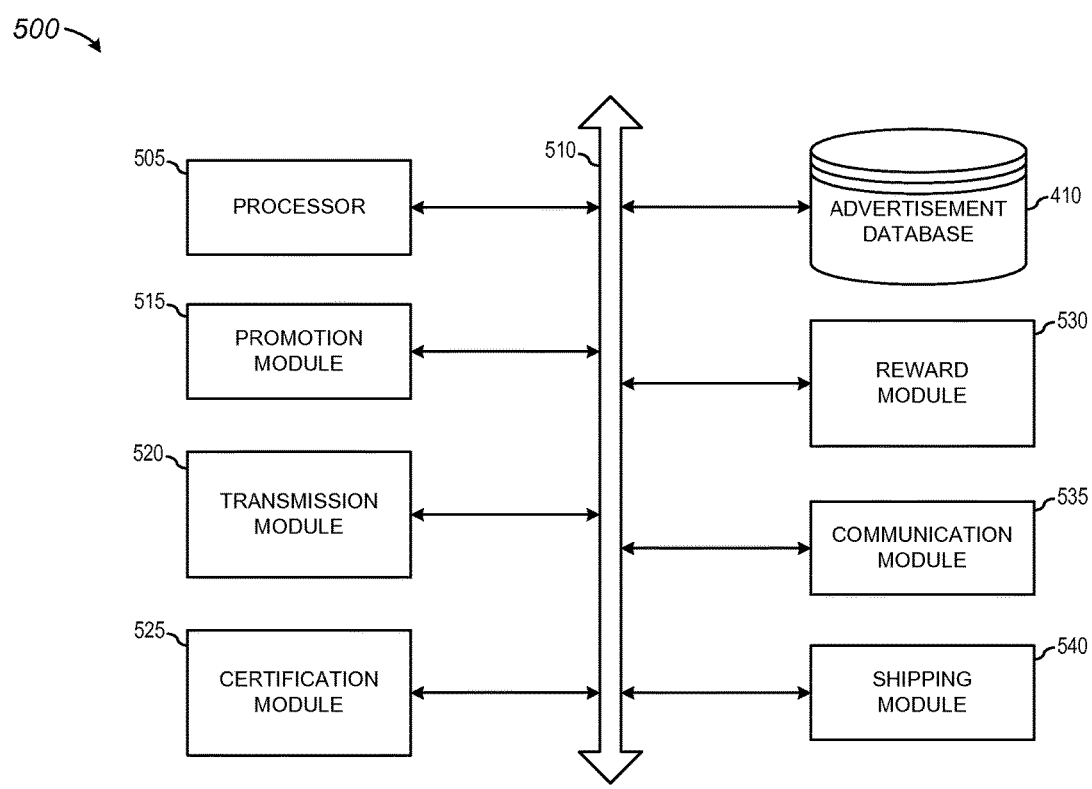
FIG. 5 is a block diagram of a promotion system, according to example embodiments.

FIG. 5 depicts a block diagram of a promotion system 500, according to an example embodiment. The promotion system 500 may include a processor 505, which may be communicatively coupled to the advertisement database 410 via a bus 510. The bus 510 may be communicatively coupled to the Internet 415 and provide Internet access to the promotion system 500. The advertisement database 410 may be configured to store the promotional description 205, indications of confirmed purchases and indications of activation of user-actionable links 210 (described below).

The promotion system 500 may also include a promotion module 515 coupled to the bus 510 and configured to create the promotional description 205, including a promotional item description and the user-actionable link 210. The promotion module 515 may be communicatively coupled to the processor 505, via the bus 510, to receive instructions for the generation and configuration of the promotional description 205. A transmission module 520 may be configured to receive the promotional description 205 from the promotion module 515, and transmit the promotional description 205 to a user device 305 associated with a user identifier.

A certification module 525 may be configured to confirm that a purchase, potentially being received from the network access devices 425, conforms to a prescribed shopping behavior, according to some example embodiments. The certification module 525 may produce a confirmed purchase indication, which may be communicatively coupled via the bus 510 to any of the further modules of the promotion system 500 and/or the Internet 415. A reward module 530 may be configured to produce a user-selectable link 210 (described below) that may be configured to grant a promotional item upon receipt of the activation indication corresponding to the user click-selecting the link at checkout of the shopping session.

The promotion system 500 may also include a communication module 535, which may be configured to receive an activation indication of the user-actionable link 210 when a user scans the user-actionable link 210 in the form of a scannable code. The communication module 535 may also receive a purchase indication associated with a promotional site at an online ecommerce site, according to some example embodiments. A shipping module 540 may be configured to ship the package 105 according to an initial purchase at the online ecommerce site. The shipping module 540 may also ship the advertisement 110 including the promotional description 205. The shipping module 540 may ship the original purchased item to a location associated with the user identifier, which may be the address where a user associated with the user identifier lives or receives packages. The promotion system 500 may correspond, according to some example embodiments, to the promotion server 405 and the advertisement database 410.

Any of the modules of the promotion system 500 may be utilized to produce a dynamically generated promotional description 205, which is presented at the instant the package 105 is opened and the user-actionable link 210 is activated. In this way, the most recent information and shopping history relating to the user ID may be taken into account for producing the greatest enticement to the shopper for consummating a further purchase. According to some example embodiments, a promotion, including the promotional description 205 and associated instructions and/or directives, may be utilized to review information (e.g., the recent shopping history connected with the user identifier) that is associated with the shipment 100. The associated instructions and/or directives may be maintained in the advertisement database 410, for example. The promotion module 515 or any other appropriate module of the promotion system 500 may evaluate any items that have been the subject of the recent shopping history, either singularly or in combination, to determine the relevancy of those items to the present promotion 200.

Figure 6:
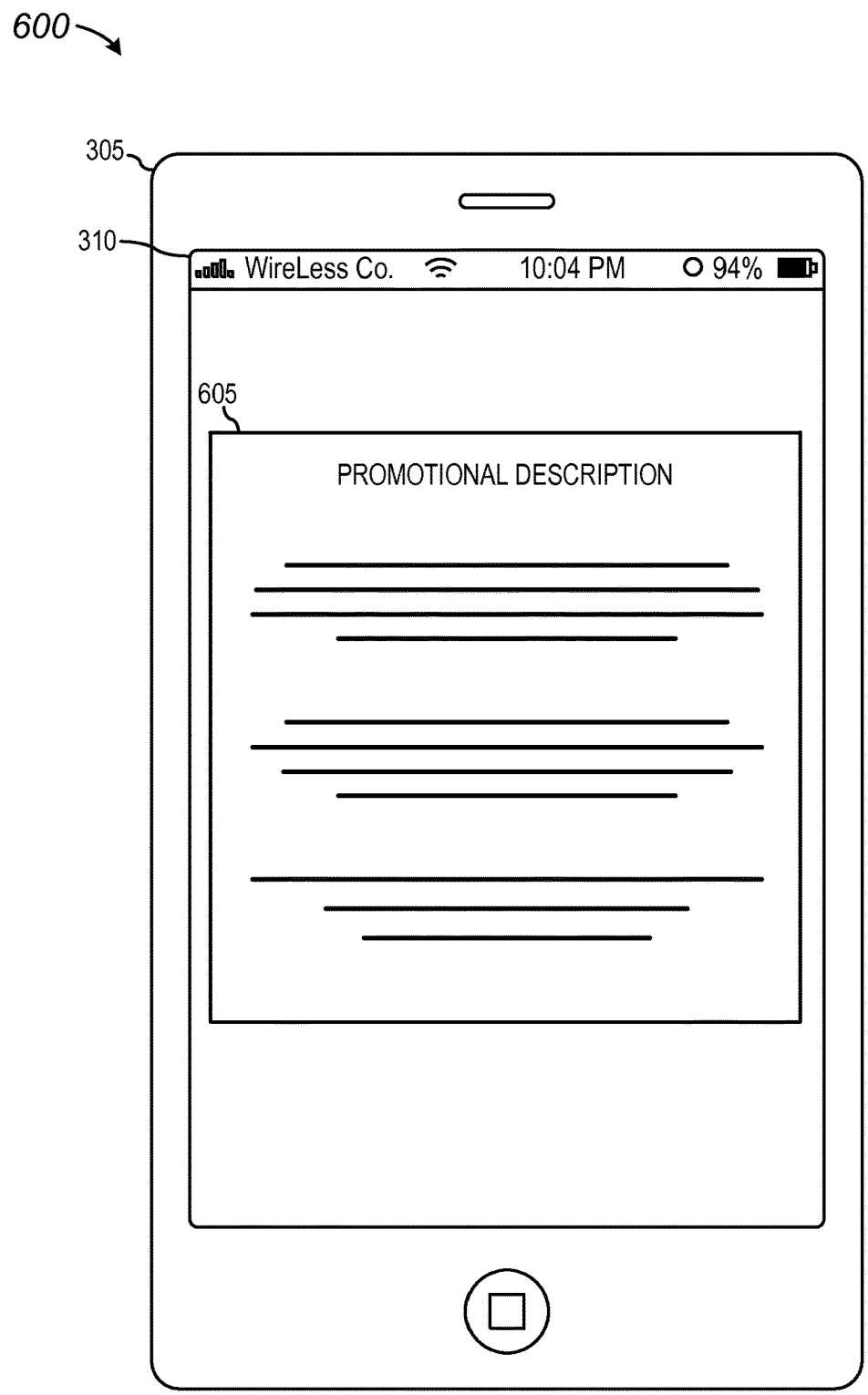
FIG. 6 is a diagrammatic representation of a promotional description presentation at a promotional site, as may be used in example embodiments.

FIG. 6 is a diagrammatic representation of a promotional description presentation 600 at a promotional site shown on a user device display 310, as may be used in example embodiments. The promotional description 605 may appear in the user device display 310. Scanning of the user-actionable link 210 on the advertisement 110 may trigger the presentation of the promotional description 605 from a promotional site (not shown).

A promotion 200 may be offered electronically as an email, a Short Message Service (SMS) message, or an e-card, for example. An electronic promotion 200 may include a user-selectable link 210, such as a Hypertext Markup Language (HTML) link, or hyperlink, embedded electronically within the message. The HTML link is an electronic link corresponding to the user-actionable link 210 in the flyer, as described above. Similar behaviors and benefits may be exhibited by the HTML link as were described above in relation to the user-actionable link 210 associated with the promotional description 205 of the flyer. For example, a click-selection by the user of the hyperlink may cause a web browser session to be directed to a promotion site having a presentation of a promotion 200. The promotion 200 may be targeted to the user, may correspond to their purchased item, and take into account the context of the user device 305 at the time of the click-selection of the user-selectable link 210 in the email or message. In a further example embodiment, a user may be able to enter a web address into a browser and navigate an Internet session to the same promotion site connected to by the electronic link or hyperlink.

A user may also have a promotion 200 offered electronically through a social networking site where the user and an associate are members of the social network, belong to a common group or have a further connectivity in a network situation offered by the social network provider. Additionally, third-party applications with more point-focus functionality may provide specific applications for a mobile device, such as a Smartphone, or applications for general use at a webpage on either a mobile device or the site computer where messaging and correspondence may occur between users.

The promotion 200 may be part of a promotional campaign, or simply a "campaign," where the promotion 200 is created by a seller and used to prompt the user to access the online site and gain access to further enticements and purchasing opportunities. The opportunities in the promotional campaign may be available at an online promotion site in a similar manner to a simple promotion. At the promotion site, the campaign may provide a broad range of purchasing alternatives to the shopper. In a promotional campaign, a seller may provide more offerings across a broader range of sales items, and present them in combinations that include enticements to the shopper that are based on volume or market place information available to the seller since the original sale and packaging of the flyer. The broader range of product offerings and promotional descriptions in the campaign may promote more sales by more shoppers than would individual promotions.

Figure 7:
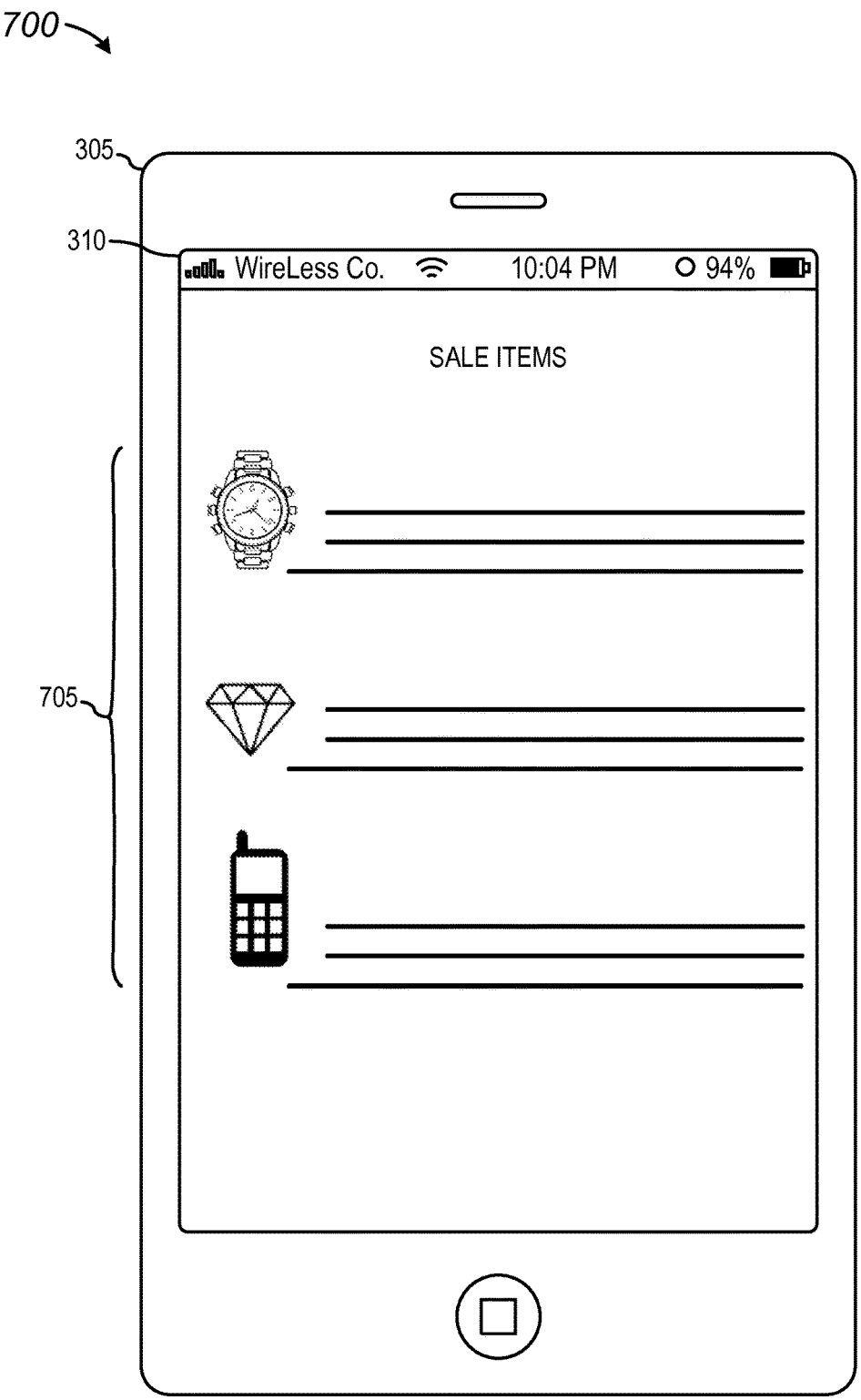
FIG. 7 is a diagrammatic representation of a shopping session presentation at a promotional site, according to example embodiments.

FIG. 7 is a diagrammatic representation of a shopping session presentation 700 at a promotional site shown on a user device display 310, according to example embodiments. The shopping session presentation 700 may include at least one promotional item listing 705 on the user device display 310 of the user device 305. The promotional item listing 705 may be any sale item or items that the seller wishes to feature as part of the promotion 200. The sale item(s) featured in the promotional item listing 705 may be a combination of related items, a particular number of items (to qualify for the promotion), or inventory closeouts, for example. The seller may choose sale items, believed to be, of optimal interest to the buyer at the time the promotional description 605 is presented.

The seller's efforts to write the promotional descriptions 205, 605 aligning their inventory and promotional sales packages to a buyer with recent purchasing momentum with the seller. The seller-tailored promotional descriptions 205, 605 may be more highly leveraged than are similar descriptions of generic promotion packages addressed to broader shopping audiences. The seller may craft highly tailored promotional descriptions 205, 605 that are targeted to specific groups of shoppers, or to a specific shopper based on recent purchasing experience with the seller. By modifying and arranging promotional description elements, the seller may customize promotional descriptions 205, 605 to a level of resolution that matches the focus on sales items the seller may believe offer the best opportunity for a sale.

A promotional campaign may include offerings by multiple sellers, promotional benefits gained through an amalgamation of featured sales items available to the shopper. A promotional campaign may capitalize on offering sales items across a broader range of categories when multiple sellers collaborate. Sellers may provide offerings of their sales items in attractive combinations in a manner where the individual procurement and sale of such items would not have the same synergy and inducement to buyers. For example, separate sellers of tents, sleeping bags, and camping equipment may collaborate to offer promotions of camping packages that include varieties of their respective sales items in each package. These camping packages may offer a solution to the buyer's camping experience that both satisfies their desires and reduces the amount of shopping that would be required for acquiring the individual items separately.

A further benefit of the combination packages may be that the price of the combination package is lower than the cost of purchasing each item separately. Factors that may induce sellers to collaborate with one another may include the range of sales items sold from their respective inventories, the inducement of sales at a particular time which may be determined by the respective sellers, and the total number of items that may be sold. The sellers at the online sales site may utilize a fulfillment center offered by the online site. The fulfillment center may deliver the package deal as a single package shipment and reduced shipping fees. Thus, the combination of the ease of shopping, reduced shopping time, and reduced shipping fees, may be the final inducement to make the combination package purchase. Concurrently, multiple sellers are provided with a highly leveraged opportunity to collaborate and capitalize on offering package deals in a promotional campaign.

A buyer's initial purchased item and their associated shopping behavior may be utilized by the online site to form presentations of further sales items in a particular promotion 200. At the time of purchase, the user's profile, shopping history, purchasing statistics, and further user connections (e.g., fellow shoppers and social networks) are known to the ecommerce site. This user information may be used as a reference for forming selections of promotional items to be used in future promotions 200. The online site or the sellers may direct the promotion 200 to include further sales opportunities that relate to the initial sale.

Further sales items offered in a promotional description 205, 605 may take into account the buyer's purchasing history at the online site in a particular product line or area of products. For example, the seller may be triggered by the shopper's purchase of an album to consider a further promotional description 205, 605 to be offered in a flyer. The seller may receive the trigger as a notification from the seller's knowledge of the buyers purchasing history or by a notification coming from the online site that is based on the buyer's historical purchasing information maintained at the online site.

The seller may be prompted to construct a promotional description that offers a further album from the same artist to the shopper. By referencing the buyer's shopping history, the seller may see that the buyer has a history of a substantial number of purchases of albums by the same artist as the present purchase, as well as some further purchases of albums by other artists and albums in other genres of music. By analyzing the shopper's purchasing history at the online site, the seller may deduce that offering a further album by the same artist may not be as likely to promote a further sale as would an album from one of the other genres that the buyer has shown an interest in.

By reviewing the shopper's purchasing history, the seller may perceive certain behaviors by the buyer, such as continually buying a certain type of product in a fairly focused area of the marketplace followed by a succession of purchases in slightly different or adjacent marketplaces after a certain period of time. These behaviors may signal the seller that the buyer's interest in a particular market place may have become satiated and that seller move on to the adjacent marketplace for the sake of variety. Noting this type of behavior may prompt the seller to select further musical albums, in order to capitalize on the seller's baseline interest in music, but select albums for promotion from a sampling of alternative genres of music. The seller may craft the promotional description 205, 605 to trigger the buyer's likelihood to desire diversity rather than risk prompting the further sale of another album by the same artist. A cumulative number of relatively recent purchases of albums by the same artist may signal the seller that it is time for the buyer to pursue a purchase based on diversity rather than the familiarity.

Between the time the buyer purchases the original sales item and opens the package 105 containing the promotional flyer, further purchasing opportunities may have occurred in the marketplace and at the online shopping site. An ecommerce site may utilize information that has occurred in the window of time between the original item purchase and the user's exercising the actionable link to tailor the promotion 200 to more precisely induce a further shopping experience by the buyer.

When a user's information is taken as a baseline, certain facts about the user may be combined with information gained by the ecommerce site since the time of the original sale. The recency of the information gained since the original sale may provide input for further incentives and insights into how to present an up-to-the minute promotion 200 to the user at the time the package 105 is opened. The baseline information may indicate fundamental types of products or shopping areas of general interest to the user that may be leveraged to select aspects of more recent information that point to further sales item offerings.

At the time the user activates the user-selectable link 210, the ecommerce site may have up-to-date information or "the latest information" that can be combined with the baseline information. The latest information may include further enticements and indications of sale item availability that may lead to more particular promotions in the user's same general areas of interest. The more particular promotions 200 may have a tighter focus or be more timely matched to the user's buying interests. For example, an initial sale to the buyer of a jersey worn by a favorite player during their initial season with the team may be the trigger for a seller to offer a commemorative jersey autographed by the same player and made available during a championship series during a subsequent season. The combination of the baseline information with the latest information may present a greater motivation for the user to make a purchase than would a promotion using only the baseline information.

The latest information may include changes in available inventory, an inventory clearance, price changes, factory incentives, and seller-sponsored promotions that may be included in the online promotion 200 at a promotion site. The instant generation of the promotion 200 may take into account the up-to-the-minute status in these quantities at the time the user activates the user—selectable link 210. Other immediate influences on the promotional offering may be a change in weather, the location of the user (user device 305), season of the year, and holidays. For example, locational information, provided by the global positioning system (GPS) facilities available in a Smartphone, may be used to provide location information to the online site at the time of activation of the user-selectable link 210. A further example of obtaining locational information may be the tapping into or "snooping" of the buyer's social network where posts or blogs may contain up-to-the-minute location information pertaining to the buyer.

Other influences on the present promotion 200 may be based on location, and include the proximity of the user device 305 to a further user, a notable location (such as a monument, statue, historical building), or special event (sporting competition, concert, festival). For example, the baseline information about a user may include a purchasing history of a certain musical artist. At the time the user activates the user-actionable-link 210, their location at a music festival on a date that the same artist is performing may prompt a promotion 200 of a particular album or commemorative album set to the user. This tailoring of promotional sales items indicates how a promotion 200 may be formed that would not have the same meaning if it were provided a day earlier or a day later.

For example, in a promotional campaign, the same musical artist as above performing at the same music festival, might offer an autographed box set of selected albums and available for persons attending the performance. In this example, the user's history, preference for the artist, the time window for the music festival, and the user's attendance at the performance may be taken into account to produce a qualifying behavior for obtaining special sales items as part of the campaign.

The seller may also derive a promotional description 205, 605 based on the shopper's location and may select at least one promotional description 205, 605 based on the proximity of available inventory to the shopper. By knowing that the shopper is close to a particular warehouse or fulfillment center, the seller may be able to construct a promotional description 205, 605 that includes a lower shipping fee or shorter shipping time for products the shopper selects from the targeted warehouse. In this way, the seller is able to combine knowledge about a particular shopper with the content of a promotional description 205, 605 to more optimally entice the shopper to become a buyer.

The amount of the seller's available inventory may be brought to the online site's awareness by a countdown indicator present in the seller's webpage for sales items. By noting a relatively low level of inventory, the online site may prompt the seller to conclude the promotion 200 or modify the promotional description 205, 605 to prompt a closeout sale. The seller may respond to the prompts by the online site by adjusting the promotion 200 and promotional description 206, 605 accordingly. An alternative response by the seller may simply be to increase the amount of available inventory from stock they have on hand but not indicated at the online site. The countdown indicator would accordingly be updated, and the prompts from the online site to the seller would cease.

The seller may develop a promotion 200 and promotional description 205, 605 during the time between an item purchase and the user's activation of the user-selectable link. The promotion 200 may be constructed at the time the user-selectable link 210 is activated. In this way, the latest information available to the seller and the online marketplace may be utilized in building a final version of a promotion 200 or promotional description 205, 605. A seller may craft many portions of promotional descriptions 205, 605 that may be aggregated by a particular selection process at the time the user-selectable link 210 is activated. Alternatively, the seller may construct many different and complete promotional descriptions 205, 605 that are both appropriate and targeted for a multitude of different situations that may be in effect at the time a desired promotional description 205, 605 is delivered to the shopper.

For example, a seller may construct portions of promotional descriptions 205, 605 that present promotional benefits available to the buyer with a qualifying purchase of various sales items or product lines. The seller may word these promotional description portions in a general manner so that they may be selected and included in a final promotional description 205, 605. The seller may also, similarly, construct portions of promotional descriptions 205, 605 that present benefits targeted at buying particular quantities of targeted sales items. The seller may craft further portions of promotional descriptions 205, 605 that state particular amounts of a percentage discount available at checkout.

By selecting any one of the three preceding partial promotional descriptions, the seller may be able to instruct an aggregation process in selecting particular promotional description portions that are desired by the seller to be assembled into a final promotional description 205, 605. In this way, the seller may assemble a promotion 200 that optimally presents a particular sales item being offered at a given percentage discount on certain quantities purchased. This promotion 200 may be triggered when a marketplace condition conducive to inventory reduction becomes known to the seller. The final promotional description 205, 605 delivered to the shopper may be the most appropriate for the latest information available to the seller and online marketplace at the time a buyer activates the user-selectable link 210. Additionally, the seller may have both partial promotional descriptions and aggregation processes in place to assemble complete promotional descriptions 205, 605.

The seller may also have a further final filter or release mechanism based on conditional considerations for allowing only certain complete promotional descriptions 205, 605 to be available for presentation to the shopper by the online site. Even though the seller may have assembled a complete set of selectable portions of promotional descriptions and aggregations of final promotional descriptions, the seller may not want all of these final promotional descriptions 205, 605 available for presentation to the shopper at all times. The final filter described here presents a final mechanism for the seller to gate and control which promotional descriptions 205, 605 are available to shoppers. In this way a seller gains complete control over the latest promotional description 205, 605 they may want to provide shoppers and base that decision on the most recent marketplace information available to them.

The seller may have information about market conditions that influence the price and availability of further items like, or related to, the item purchased by the user. For example, the seller may become aware of a shortage of the purchased item or a change in the availability of resources required by the manufacture of the purchased item that will cause the price of the item to increase, perhaps, significantly. This knowledge may prompt the seller to create a promotional description 205, 605 that includes information and news snippets about the inevitable price increase, and make an offering of the item available to the buyer prior to the inevitable decrease in the item's availability. This knowledge may prompt the buyer to purchase more of the item while he/she still can.

The seller may know about an overabundance of the original purchased item in the marketplace that has occurred since the buyer purchased the item and, thus, be motivated to reduce their inventory before competitors flood the marketplace with large volumes of the item. The seller may be motivated to create a promotional description 205, 605 and sales offering that promotes purchases by any buyer activating the user-selectable link 210 from the flyer during a certain period of time.

According to one example embodiment, the sales offering featured in the promotional description 205, 605 may present escalating discounts for corresponding increases in the number of the item purchased by buyers. In this way, the seller combines knowledge about a likely near-term trend in the price of an item with knowledge about customers who have recently purchased this type of item. Receipt of an activation of the user-selectable link 210 at the online marketplace from a customer who has recently purchased the item may present the buyer with the seller's promotion 200. When the promotional description 205, 605 prompts the buyer to a further purchase of the item, both the buyer's and the seller's interest in a further transaction of the item is satisfied.

The seller may become aware of certain marketplace knowledge that will certainly influence the price and availability of a sales item. The seller may desire to couple that knowledge with known buyers of the item, and induce a further sale addressed to these known buyers that may be facilitated and influenced by the market conditions. By crafting a promotional description 205, 605 and offering a promotion 200 in line with the marketplace knowledge about the sales item, the seller may provide a coupling of the promotion 200 and potential buyers by utilizing the flyer, the user-selectable link 210, and delivered packages of recent buyers. By doing so, the seller gains significant leverage in producing further sales by combining the marketplace knowledge and known customers in an exceedingly timely and motivated environment. The flyer and user-selectable link 210 bridge the gap between these known customers and a promotion 200 based on the latest marketplace information. Thus, the seller has a significant leverage over competitors by matching customers and market conditions through promotional crafting.

In this way, a seller may establish multiple promotional descriptions 205, 605 that are targeted for the economic trends in multiple marketplaces. The promotional descriptions 205, 605 may be matched to economic trends and be correlated to appropriate shoppers through the same mechanisms at the online marketplace. The seller may be aware of more than one marketplace trend that may influence a corresponding type of sales item. These marketplace trends may induce fundamental sales or changes in the seller's inventory across a broad range of product types. Each marketplace trend may influence only directly related product types or perhaps many different products.

A seller may create multiple promotional descriptions 205, 605 to cover a range of sale items available in their inventory. These promotional descriptions 205, 605 may be intended to describe promotional items offered to qualifying shoppers at the online marketplace. The promotional descriptions 205, 605 may be sorted according to the seller's prioritization for inclusion on flyers (or alternate promotional delivery embodiments as described above). The prioritization may reflect the seller's incentive to move certain items based on an initial set of market conditions. Within the prioritization, qualifying shoppers may be presented with appropriate promotional descriptions 205, 605 based on some aspect of the shopper's original purchase matching a particular promotional description 205, 605. At a later time, marketing conditions may have changed such that the seller may be motivated to reprioritize the probability of including a given promotional description 205, 605 with a flyer based on the seller's interpretation of the new market conditions. In this way, the seller may utilize their interpretation of matching a given promotional description 205, 605 to a present marketing condition in an effort to optimally target shoppers.

The purpose of the promotional description 205, 605 and featured promotional item are to induce a further (qualifying) purchase by the shopper. When the promotional description 205, 605 and featured promotional item have successfully induced this purchase, the shopper becomes a buyer and may proceed to a checkout webpage to complete their purchase at the online site. In order for the buyer to receive the benefit of the promotional item, a mechanism may be included in the checkout process to activate, or "grant" the promotional item.

Figure 8:
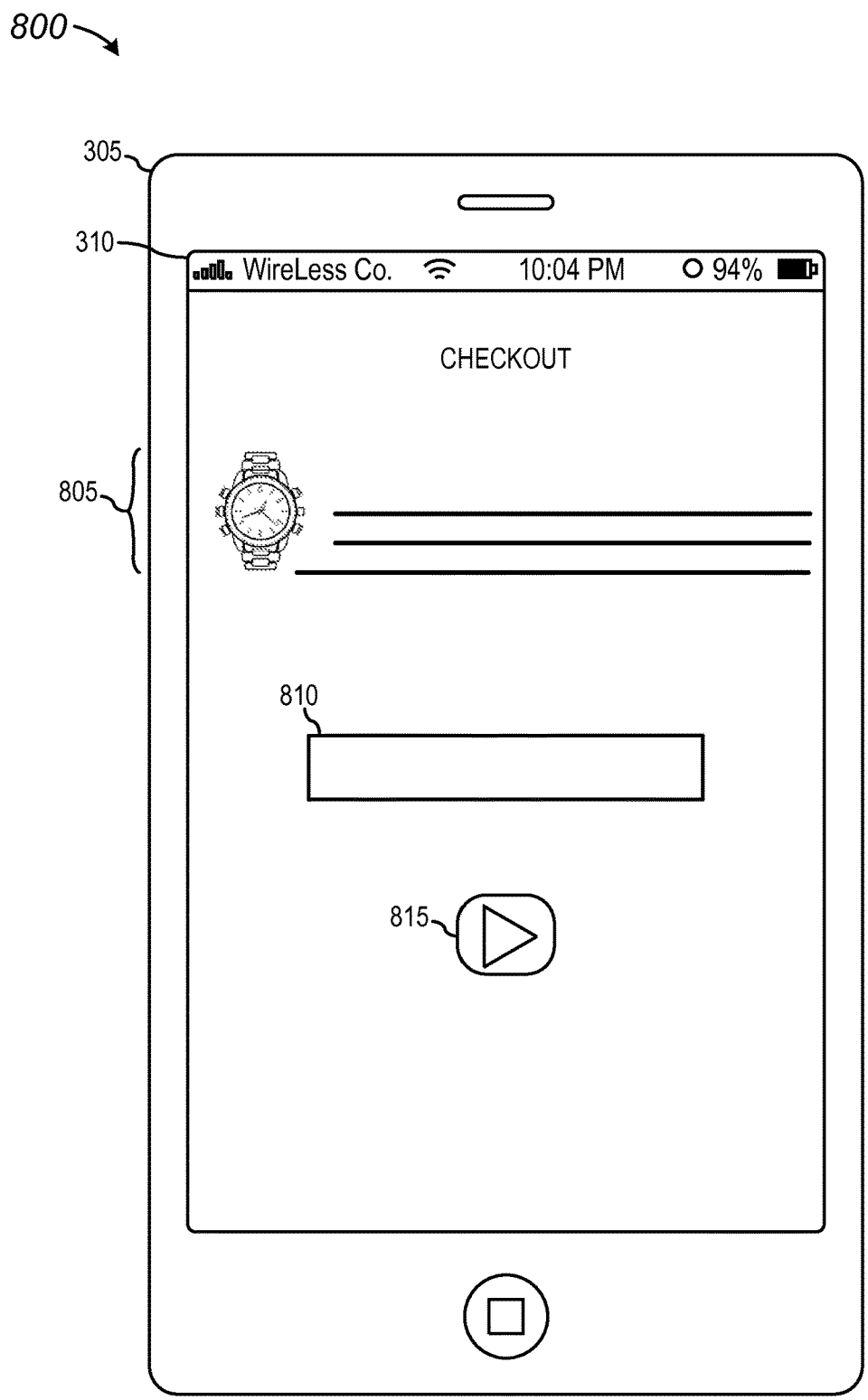
FIG. 8 is a diagrammatic representation of a checkout site with a user-selectable link, as may be used in example embodiments.

FIG. 8 is a diagrammatic representation of a checkout site 800 with a user-selectable link 815 shown on a user device display 310, as may be used in example embodiments. The checkout site 800 may include a purchased item 805 that has been presented by a seller as a qualifying purchase as part of a promotion. The purchased item 805, when purchased as part of the promotion 200 and identified as the qualifying purchase, may be referred to equivalently as the qualifying purchase item. In order to activate a promotional benefit, such as a promotional item (not shown), the buyer may enter an activating code in an entry field 810 or click-select a user-selectable link 815. A particular code may have been presented to the shopper in the promotional description 605 presented after the activation of the user-actionable link 210. This particular code may be entered in the entry field 810 to activate the promotional item or "promotional benefit." (Previously, you mention that the user actionable link 210 may also be referred to as a user-selectable link; however, in this description, it seems they are different because you label the user selectable link as 815)

The promotional item may be granted when a qualifying purchase has been made. The qualifying purchase will have been presented as a stipulation in at least a portion of the promotional description 205, 605. The qualifying purchase needs to be checked and verified. The qualifying purchase will match the promotional description 205, 605 and directly indicate which promotional item may be included with the purchase. The online site may include a process of identifying characteristics of a purchase and match them to a corresponding promotional item. The original shopping context for the qualifying purchase may have been a promotional or promotion campaign shopping site provided by the online merchant. Within this shopping context, matching a qualifying purchase to an associated promotional benefit is accomplished within a focused environment that may enhance matching the purchase with the promotional benefit.

When a qualifying purchase triggers more than one promotional item, a mechanism may be provided to the buyer to register their selection of the particular promotional item that they desire. Within the checkout webpage offered at the conclusion of the promotional shopping session, the user-selectable link 815 may be offered to the buyer to trigger inclusion of the promotional item with their purchase. When more than one promotional item qualifies according to the purchase, further user-selectable links 815 may be offered to the buyer to capture their particular selection.

Activation of the user-selectable link 815 may trigger a process to verify that the purchase matches an appropriate promotional description 205, 605 and qualifies to receive the promotional item according to that promotional description 205, 605. A further possible check to fully qualify the granting of the promotional item may include checks by the online system to verify that the promotional item is in stock when the promotional item is a physical promotional benefit. Further checking to qualify the promotional item may include confirming that a specified timeframe, which may be provided in the promotional description 205, 605, is satisfied at the time the user-selectable link 815 is activated.

On successful completion of the qualified purchase, the appropriate promotional item is added to the purchase and indicated in the checkout presentation. The addition of the promotional item may cause an update of the information displayed to the buyer in the checkout website. The buyer can see a clear indication that the promotional item has been added and may visually inspect that the promotional item corresponds to the one they expected.

Alternatively, the user-selectable link may be an entry field 810 provided on the checkout webpage where the buyer may click and paste a promotion code copied from a further webpage in the shopping process. During the shopping process, the shopper may have been presented with a promotion code and explanatory text to connect the promotion code with a particular sales item. More than one sales item and corresponding promotion code may be present on a given shopping webpage. By click-selecting and copying the promotion code, the browser's buffer may capture the promotion code for clicking and pasting into the entry field 810 at checkout.

Entry of this promotional code into the entry field 810 may cause the promotional confirming process to be triggered, and prompt the promotional code to qualify the purchase and effect granting of the corresponding promotional item. Additionally, the buyer may enter the promotional code into the entry field 810 as text entries from their keyboard.

The seller may develop corresponding sets of promotional descriptions 205, 605, and create a flyer and user-selectable link 210 combinations that are made available to tens or hundreds of buyers. The large number of buyers may be presented with an inducement to make a purchase covering most of the seller's inventory with the triggering of a relatively small number of promotional descriptions 205, 605 and flyer deliveries. The corresponding user-selectable link 210 may trigger a promotional description 205, 605 that was crafted by the seller only moments before the activation of the user-selectable link 210 by the buyer. The range of promotional descriptions 205, 605 may take into account the latest promotions 200 by the seller to adapt their sales position to a range of marketplace trends affecting a large number of sales items and item types.

Figure 9:
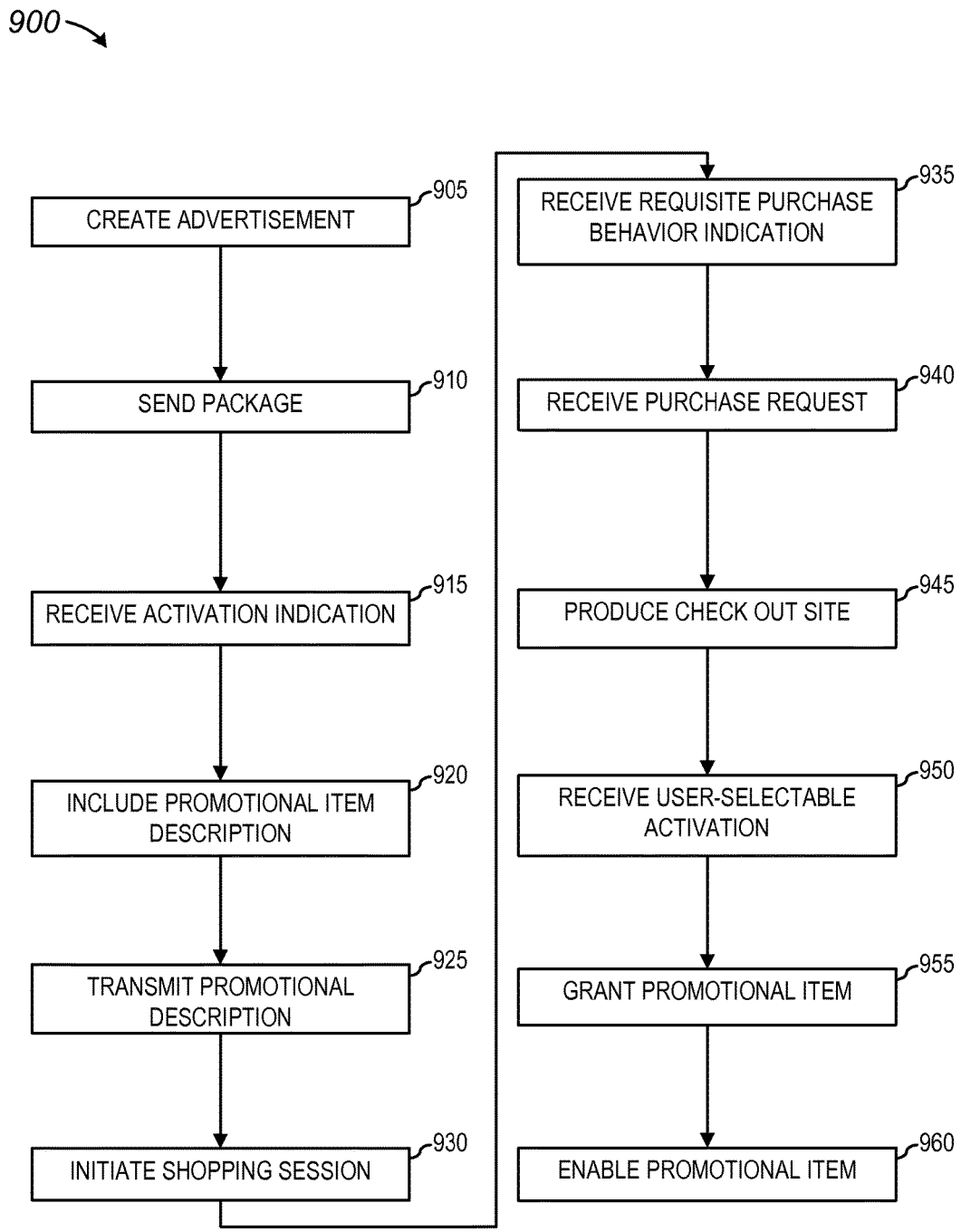
FIG. 9 is a flow diagram illustrating a method of promotion implementation, as may be used in example embodiments.

FIG. 9 is a flow chart illustrating a method of promotion implementation 900, according to an example embodiment. The method to implement a promotion 900 may be performed by any of the modules, logic, or components described herein. The promotion implementation 900 commences with the creation of an advertisement 905, including a promotional description 205 and a user-actionable link 210. The user-actionable link 210 utilizes, on activation by a user, at least one processor 505 to connect to a promotional site within an online commerce site. The online commerce site may be a website produced on user device display 310 and includes the promotional site in at least a portion of the ecommerce site content.

The promotion implementation 900 continues by causing the sending of a package 910 or shipping box to a location associated with a user identifier. The location may be the address where a user associated with the user identifier may live, may receive mail, or be a shipment receiving location, such as a third-party shipment center. The package 105 may include the advertisement 110 and the purchased item 805, for example.

The promotion implementation 900 progresses by receiving the activation indication 915 corresponding to the user-actionable link 210. Receipt of the activation indication of the user-actionable link 210 means that the advertisement 110 has been discovered, and the user-actionable link 210 has been scanned or a user has entered a code corresponding to the user-actionable link 210. The promotion implementation 900 progresses by including the promotional item description 920 in a further promotional description 605. The further promotional description 605 will be presented to the user device 305 after the advertisement 110 is discovered during the unwrapping of the package 105 and the user-actionable link 210 is activated. The further promotional description 605 may include further promotional incentives to the shopper based on information gained by the seller since the original item was purchased.

The promotion implementation 900 progresses by transmitting the further promotional description 925 (e.g., promotional description 605), including a promotional item description to the user device 305 to be displayed as a portion of the promotional site presentation. The transmitting 925 is initiated in response to receiving the activation indication of the user-actionable link 210, which may be associated with the user identifier and the advertisement 110. The promotion implementation 900 also responds to receipt of the user-actionable link 210 by initiating the shopping session 930 at the promotional site. The shopping session is associated with the user identifier and corresponds to the promotion 200. The shopping session may be initiated with a shopping interface on a mobile device, and the shopping interface may be a mobile web browser or a mobile application, for example.

The promotion implementation 900 may next receive an indication of a requisite purchasing behavior 935 by the buyer that corresponds to the promotion 200 and is associated with the user identifier. The requisite purchasing behavior may include, for example, shopping at least a portion of the promotional site and selecting the promotional item listing 705 for consideration. In a next step, the promotion implementation 900 receives a purchase request 940 from the user device 305. The purchase request may include a description of items the buyer has selected for purchase. The purchase request may correspond to the promotion 200 and the shopping session initiated at the promotional site in connection with the promotion 200.

The promotion implementation 900 may go on to produce, a checkout site 945 at the conclusion of the shopping session, including a user-selectable link 815 and an indication that selection of the user-selectable link 815 grants a promotional item. The checkout site 800 may generally correspond to a regular checkout webpage. However, the context of the promotion 200 and the receipt of the requisite purchasing behavior by the buyer may mean that a special entry field 805 and/or user-selectable link 815 may be produced within the checkout site 800. In this way, the promotion 200 may trigger the enablement of the receipt of the promotional item by the buyer according to the buyer's use of the special entry field 805 or the user-selectable link 815.

The promotion implementation 900 may continue by receiving an indication of an activation of the user-selectable link 815 in step 950. The buyer may click-select the user-selectable link 815 by using a mouse and cursor or by touchscreen enablement of the cursor with the user device 305. The promotion implementation 900 may next grant a promotional item 955 corresponding to the promotional item description in response to receiving an indication of the activation of the user-selectable link 815. Availability of the user-selectable link 815 to the user signifies that all of the buyer's requirements corresponding to shopping and buying, according to the promotion 200, have been met. The buyer's selection of the user-selectable link 815 indicates the buyer's desire to acquire the promotional item that they have qualified for.

The promotion implementation 900 may conclude by enabling the inclusion of the promotional item description 960 to a purchase of a sale item associated with the promotion 200. The promotional item description provides an indication to the buyer that the promotional item will be included with the purchase of the sale item associated with the promotion 200, and is ready for inclusion with the remainder of the checkout process and obtainable when the sale is finalized.

Certain embodiments are described herein as including logic or a number of components, modules, or mechanisms. Modules may constitute either software modules (e.g., code embodied on a non-transitory machine-readable storage medium) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by at least one processor or processor-implemented modules. The performance of certain operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier; e.g., in a non-transitory machine-readable storage medium for execution by, or to control the operation of, data processing apparatus; e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field-programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware, may be a design choice. Below, are set out hardware (e.g., machine) and software architectures that may be deployed in various example embodiments.

Figure 10:
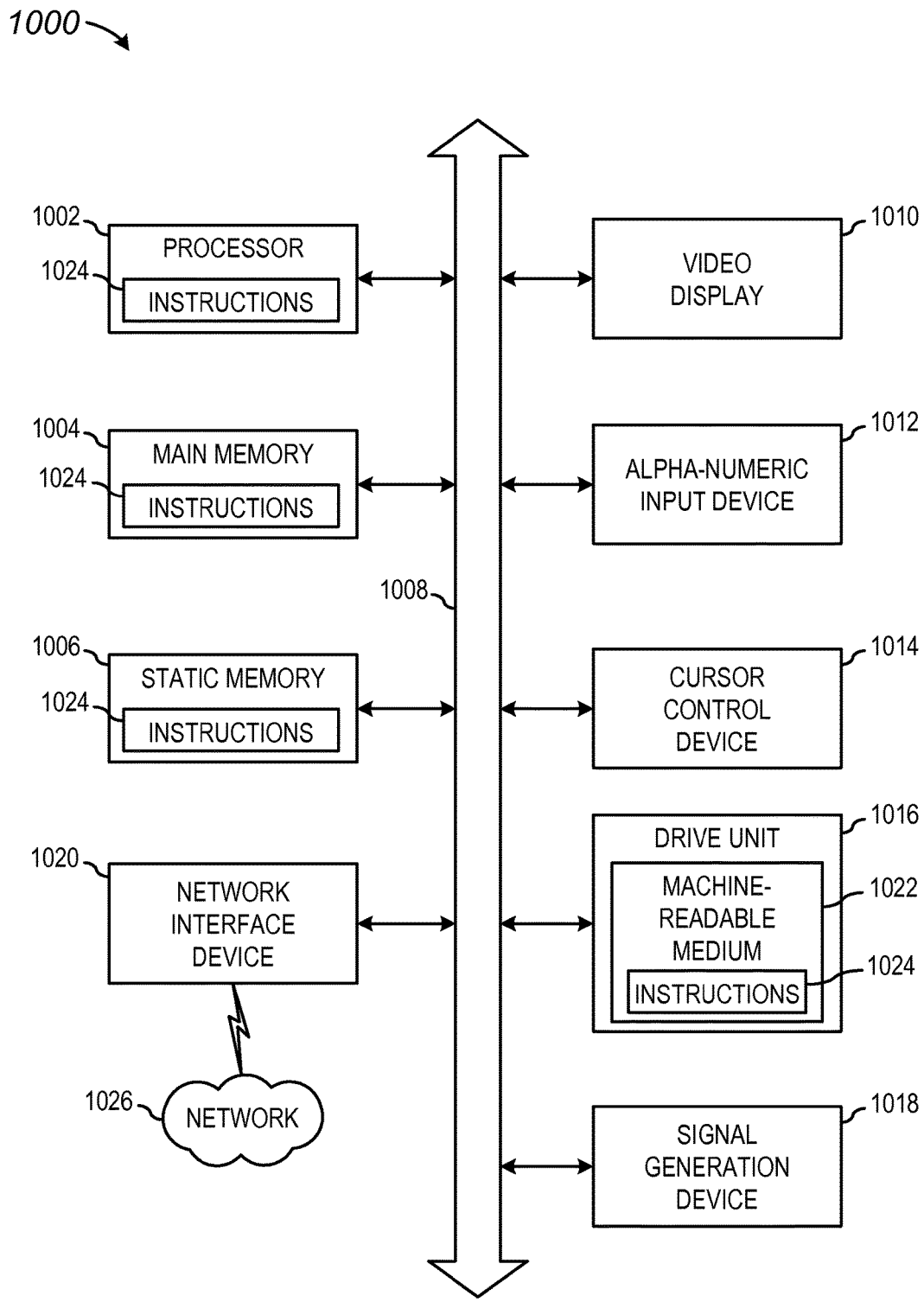
FIG. 10 is a block diagram of a machine, in the example form of a computer system, within which a set instructions may be executed for causing the machine to perform any one or more of the methodologies discussed herein.

FIG. 10 is a block diagram of a machine in the example form of a computer system 1000 within which instructions 1024, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that, individually or jointly, execute a set (or multiple sets) of instructions 1024 to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a drive unit 1016, a signal generation device 1018 (e.g., a speaker) and a network interface device 1020.

The drive unit 1016 includes machine-readable medium 1022 on which is stored one or more sets of instructions 1024 and data structures (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting non-transitory machine-readable storage medium.

While the machine-readable medium 1022 is shown in an example embodiment to be a single device, the term "machine-readable medium" may include a single storage device or multiple storage devices (e.g., a centralized or distributed database, and/or associated caches and servers) that store the one or more instructions 1024 or data structures. The term "machine-readable medium" shall also be taken to include any tangible medium that is capable of storing or encoding instructions 1024 for execution by the machine, and that cause the machine to perform any one or more of the methodologies of the present embodiments, or that is capable of storing or encoding data structures utilized by or associated with such instructions 1024. The term "machine-readable medium" shall accordingly be taken to include, but not be limited to, solid-state memories, and optically programmed non-transitory media and magnetic media. Specific examples of machine-readable storage media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi and Wi-Max networks). The term "transmission medium" shall be taken to include any intangible medium that is capable of encoding or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this Detailed Description is not to be taken in a limiting sense, and the scope of various embodiments is defined only by the appended claims, along with the full range of equivalents to which such claims are entitled.

Such embodiments of the novel subject matter may be referred to herein, individually and/or collectively, by the term "embodiment" merely for convenience and without intending to voluntarily limit the scope of this application to any single embodiment or novel concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments and other embodiments not specifically described herein, will be apparent to those of skill in the art upon reviewing the above description.

Although the present novel embodiment has been described with reference to specific example embodiments, it will be evident that various modifications and changes may be made to these embodiments without departing from the broader scope of novelty. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s). One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting," and the like, are executed by application logic that accesses and/or causes changes to, various data attribute values maintained in a database or other memory. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, system features, and system mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and, additionally, may refer to a custom or generalized API on a device, such as a mobile device (e.g., cellular phone, Smartphone, personal GPS, personal digital assistance, personal gaming device, etc.), that makes API calls directly to a server. The specification and drawings are, accordingly, to be regarded in an illustrative rather than a restrictive sense. However, it will be evident that various modifications and changes may be made thereto without departing from the broader scope of the disclosure as set forth in the claims, and that the disclosure is intended to cover all modifications and equivalents within the scope of the following claims.

The Abstract of the Disclosure is provided to comply with rules requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus, the following claims are hereby incorporated into the Detailed Description, with each claim standing on its own as a separate embodiment.

What is claimed is:

1. A system comprising:
a server comprising at least one hardware processor and a memory storing instructions that, when executed by the at least one hardware processor, cause the at least one hardware processor to perform server operations comprising:
determining location information of a mobile device associated with a user identifier based on global positioning system (GPS) data of the mobile device;
creating an advertisement, including a promotional description and a user-actionable link, based, at least in part, on the location information of the mobile device, the user-actionable link utilizing, on activation, at least one processor of the mobile device to connect to a promotional site within an online commerce site; and
causing a sending of a package to a location associated with the user identifier, the package including the advertisement and a purchased item; and
an embedded device included in the package and configured to establish a communication link wirelessly with the mobile device based on a detection of the package being within proximity of the mobile device by the mobile device using near field communication without the user-actionable link being scanned by any camera on the mobile device, and to trigger activation of the user-actionable link in response to the detection of the package being within proximity of the mobile device without the user-actionable link being scanned by any camera on the mobile device;

the server operations further comprising:
generating a further promotional description, including a promotional item description, in response to the triggered activation of the user-actionable link, the generating of the further promotional description being based on information that was not available at the time the advertisement was created, and the further promotional description comprising the information that was not available at the time the advertisement was created;
transmitting the further promotional description to a display of the promotional site at the mobile device in response to the generating of the further promotional description; and
receiving a purchase request from the mobile device, the purchase request corresponding to a promotion and a shopping session initiated at the promotional site.

2. A method comprising:
determining, by a server having at least one hardware processor, location information of a mobile device associated with a user identifier based on global positioning system (GPS) data of the mobile device;
creating, by the server, an advertisement, including a promotional description and a user-actionable link, based, at least in part, on the location information of the mobile device, the user-actionable link utilizing, on activation, at least one processor of the mobile device to connect to a promotional site within an online commerce site;
causing, by the server, a sending of a package to a location associated with the user identifier, the package including the advertisement and a purchased item, the package further comprising an embedded device configured to establish a communication link wirelessly with the mobile device based on a detection of the package being within proximity of the mobile device by the mobile device using near field communication without the user-actionable link being scanned by any camera on the mobile device;
triggering, by the embedded device, activation of the user-actionable link in response to the detection of the package being within proximity of the mobile device without the user-actionable link being scanned by any camera on the mobile device;
generating, by the server, a further promotional description, including a promotional item description, in response to the triggered activation of the user-actionable link, the generating of the further promotional description being based on information that was not available at the time the advertisement was created, and the further promotional description comprising the information that was not available at the time the advertisement was created;
transmitting, by server, the further promotional description to a display of the promotional site at the mobile device in response to the generating of the further promotional description; and
receiving, by the server, a purchase request from the mobile device, the purchase request corresponding to a promotion and a shopping session initiated at the promotional site.

3. The method of claim 2 further comprising:
receiving an activation indication corresponding to the user-actionable link; and
initiating the shopping session at the promotional site, the shopping session associated with the user identifier and corresponding with the promotion, wherein the initiating is accomplished with a shopping interface on the mobile device and the shopping interface is one of a mobile web browser and a mobile application.

4. The method of claim 2 further comprising producing, at the conclusion of the shopping session, a checkout site including a user-selectable link and an indication that selection of the user-selectable link enables receipt of a promotional item.

5. The method of claim 2 further comprising:
in response to an activation indication, initiating the shopping session at the promotional site, the shopping session associated with the user identifier and corresponding with the promotion;
receiving an indication of a requisite purchasing behavior that corresponds to the promotion and is associated with the user identifier; and
granting a promotional item corresponding to the promotional item description in response to receiving the indication.

6. The method of claim 2, wherein the further promotional description includes a description of:
the promotional item;
at least one sale item relating to the purchased item; and
a stipulation that the promotional item is granted when the purchase request includes at least one sale item description.

7. The method of claim 6, wherein the at least one sale item description includes a description of an item that has become available since a purchase of the purchased item and is selected by a seller of the purchased item.

8. The method of claim 2 further comprising:
including the promotional item description in the further promotional description, the including initiated in response to an activation indication of the user-actionable link; and
receiving an indication of the promotional item description being included in the purchase request.

9. The method of claim 2 further comprising:
receiving an indication of an activation of the user-selectable link; and
enabling inclusion of a promotional item to a purchase of a sale item associated with the promotion, the promotional item being described in the promotional item description.

10. The method of claim 2, wherein the purchase request is a purchase of a sale item corresponding to the promotional item description and associated with the promotion.

11. The method of claim 2, wherein the user-actionable link is a scannable link and one of a barcode, a two-dimensional barcode, and a quick response code.

12. A non-transitory machine-readable storage medium including instructions, that when implemented by at least one processor, performs operations comprising:
determining, by a server having at least one hardware processor, location information of a mobile device associated with a user identifier based on global positioning system (GPS) data of the mobile device;
creating, by the server, an advertisement, including a promotional description and a user-actionable link, based, at least in part, on the location information of the mobile device, the user-actionable link utilizing, on activation, at least one processor of the mobile device to connect to a promotional site within an online commerce site;
causing, by the server, a sending of a package to a location associated with the user identifier, the package including the advertisement and a purchased item, the package further comprising an embedded device configured to establish a communication link wirelessly with the mobile device based on a detection of the package being within proximity of the mobile device by the mobile device using near field communication without the user-actionable link being scanned by any camera on the mobile device;
triggering, by the embedded device, activation of the user-actionable link in response to the detection of the package being within proximity of the mobile device without the user-actionable link being scanned by any camera on the mobile device;
generating, by the server, a further promotional description, including a promotional item description, in response to the triggered activation of the user-actionable link, the generating of the further promotional description being based on information that was not available at the time the advertisement was created, and the further promotional description comprising the information that was not available at the time the advertisement was created;
transmitting, by the server, the further promotional description to a display of the promotional site at the mobile device in response to the generating of the further promotional description; and
receiving, by the server, a purchase request from the mobile device, the purchase request corresponding to a promotion and a shopping session initiated at the promotional site.

13. The non-transitory machine-readable storage medium of claim 12 further comprising:
receiving the delivery indication from a shipping provider, the delivery indication corresponding to the package and the location is associated with the user identifier;
creating the further promotional description, including at least one sale item listing, in response to an activation indication, the at least one sale item listing relating to the purchased item and the promotion;
in response to the creating, transmitting the further promotional description to the display of the promotional site; and
initiating the shopping session in association with the user identifier and featuring the at least one sale item listing, wherein the sending of the email is initiated after receipt of the delivery indication.

14. The non-transitory machine-readable storage medium of claim 12 further comprising:
initiating the shopping session associated with the promotion and the promotional site;
in response to receipt of the purchase indication, producing a user-selectable link at a checkout site, the user-selectable link corresponding to the promotion and including an indication that selection of the user-selectable link enables receipt of a promotional item; and
producing an indication corresponding to the user-selectable link indicating that the promotional item is granted when the purchase indication meets a purchasing condition.

15. The non-transitory machine-readable storage medium of claim 12 further comprising:
in response to receipt of a purchase indication, producing the user-selectable link at a checkout site, the user-selectable link corresponding to a granting of a promotional item described by the promotional item listing;

receiving a selection indication corresponding to the user-selectable link and a further user identifier; and forwarding the promotion to a further user device associated with the further user identifier.

16. The non-transitory machine-readable storage medium of claim 12, wherein at least one sale item listing includes an item selected by a seller according to a purchasing history associated with the user identifier at the ecommerce site.

17. The non-transitory machine-readable storage medium of claim 12, wherein at least one sale item listing includes an item relating to the purchased item and is one of an accessory, a volume discount, a percentage discount, a requirement to forward the promotion to a friend, a request to forward the promotional description to a social network, at least a portion of a promotional campaign, and a reduced shipping charge.

18. The storage medium of claim 12, wherein at least one sale item listing includes an item that is available to be purchased in a region where the user device is located.

19. The non-transitory machine-readable storage medium of claim 12 further comprising:

creating the further promotional description to include at least one sale item listing relating to the purchase indication and the promotion;

receiving the purchase indication corresponding to the at least one sale item listing; and granting a promotional item corresponding to the promotional item listing, the granting in response to the purchase indication, wherein the at least one sale item listing includes a description of an item that has become available since a purchase of the purchased item and is selected by a seller of the purchased item.

20. The non-transitory machine-readable storage medium of claim 12, wherein the user-actionable link is a user-selectable link embedded in the email and the activating is accomplished by a mouse click being applied with the user device.

* * * * *